March 8, 1949.   H. J. CORCORAN   2,463,520
HYDRAULIC BRAKE MECHANISM

Filed Oct. 1, 1945   2 Sheets—Sheet 1

Inventor
Herbert J. Corcoran

By Clarence A. O'Brien
and Harvey B. Jacobson
Attorneys

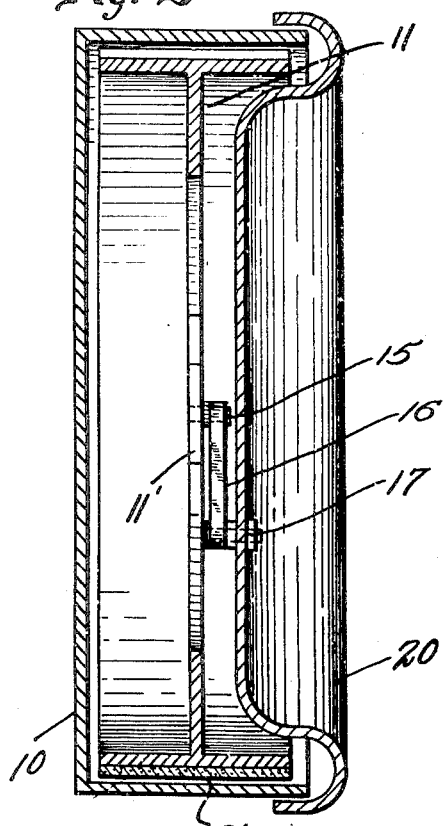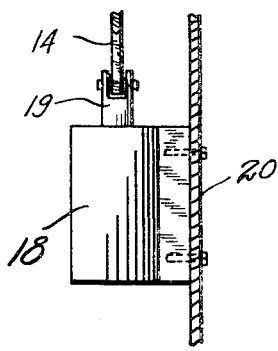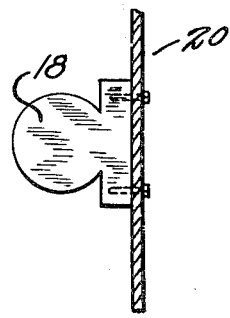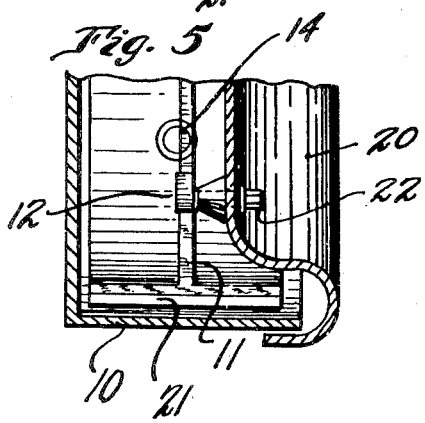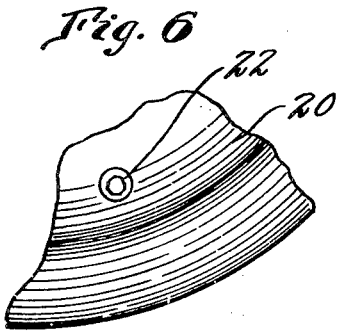

Patented Mar. 8, 1949

2,463,520

UNITED STATES PATENT OFFICE 2,463,520

HYDRAULIC BRAKE MECHANISM

Herbert J. Corcoran, Detroit, Mich.

Application October 1, 1945, Serial No. 619,456

3 Claims. (Cl. 188—152)

1

This invention relates to a hydraulic brake mechanism, and more particularly to such a device as applied to vehicle brakes and the like.

A primary object of this invention is to provide a brake construction wherein the wear on the brake shoes is substantially equalized regardless of their relative position in the drum.

An additional object of the invention is to provide relatively even wear on the brake lining at all points, and consequently longer lining life.

A further object of the invention is the provision of a brake lining which, after use and consequent wear, will be substantially evenly worn in such manner as to center the wheel on the bearing giving a smoother action.

As conducive to a clearer understanding of this invention, it may be here pointed out that the most common types of hydraulic brake used on cars today have a double cylinder actuating the ends of two brake shoes whose opposite ends pivot on stationary bearings. In this construction although the pressure is applied equally, one shoe tends to wear more than the other due to "wrap-around" which is the influence of the rotation of the drums on the brake action in accordance with the direction of travel of the vehicle. In this case one shoe tends to wedge against the drum and does considerably more actual braking than the other shoe. This results in uneven wear, enough so that various manufacturers have been forced to use different linings on the two shoes to equalize the wear. Similarly, in such a brake one shoe actually engages the drum more than the other shoe resulting in a tendency to move the wheel against the wheel bearing causing extra bearing wear and possible chattering if wheel bearings are loose. As the lining wears on a brake of this type it wears more towards the free ends than toward the pivoted ends. When the lining is worn out of its original shape it no longer contacts the drum about its entire periphery in the event that the pivot points are adjusted closer to the drum. This adjustment may not be made in many cases and as a result maximum leverage is not obtained resulting in the so-called "hard brake pedal." When a brake is relined it is often necessary to recut the drums, that is the surface of the drums are machined in order to eliminate scores. In the ordinary brake therefore it is then necessary to shim or adjust the shoes at some point in order to compensate for the amount of metal cut from the drum. The instant invention overcomes all of the foregoing difficulties in that it is so designed as to completely avoid "wrap-around" in order to obtain a smooth action. This action is

2 obtained due to the fact that the shoes are full floating, that is not rigidly anchored at any point in the drum, and are consequently self-centering in the drum and the full brake lining contacts the drum at every application.

Other objects will in part be obvious and in part be pointed out as the description of the invention proceeds and disclosed in the accompanying drawings wherein there is shown a preferred embodiment of this inventive concept.

In the drawings:

Figure 2 is a sectional view taken substantially along the line 2—2 of Figure 1.

Figure 3 is a sectional view taken substantially along the line 3—3 of Figure 1 as viewed in the direction indicated by the arrows.

Figure 4 is a fragmentary end elevational view of the portion of the mechanism shown in Figure 3.

Figure 5 is a sectional view taken substantially along the line 5—5 of Figure 1 as viewed in the direction indicated by the arrows, and Figure 6 is a fragmentary detail view.

Similar reference characters refer to similar parts throughout the several views of the drawings.

Figure 1:
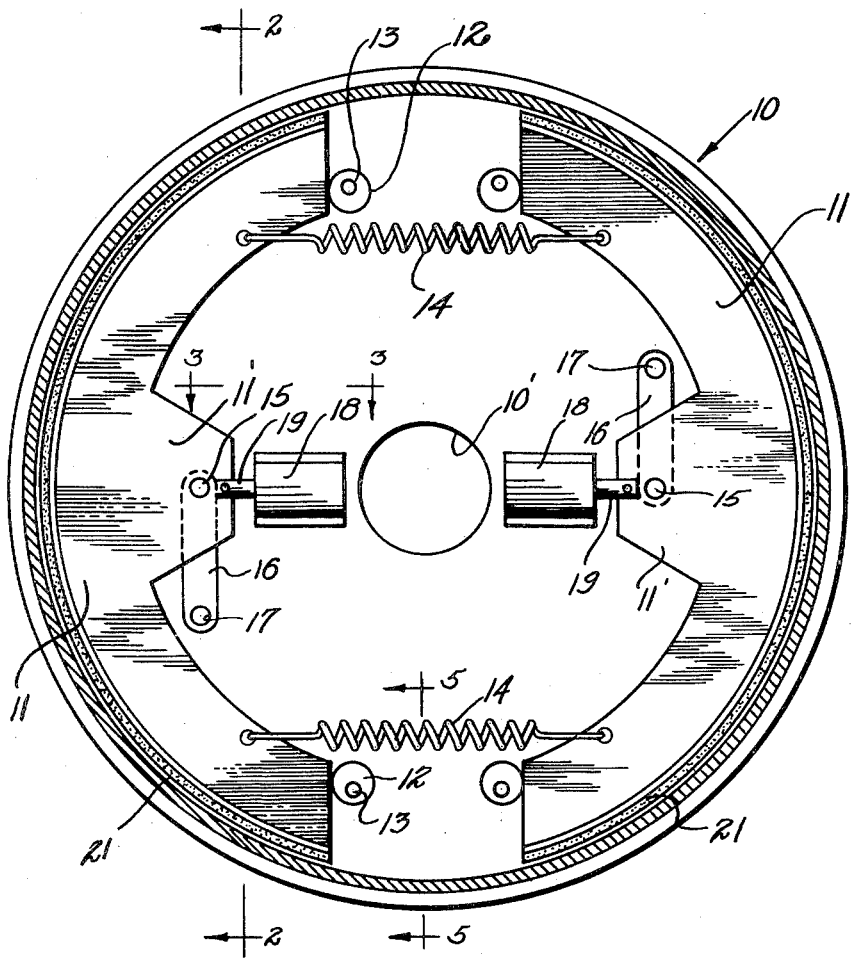
Figure 1 is a transverse sectional view taken through the axle and brake drum of a motor vehicle disclosing the brake of the instant invention.

Having reference now to the drawing, and more particularly to Figure 1, there is generally indicated at 10 a conventional brake drum having an axle opening 10' of any desired conventional type. Within the brake drum are positioned a pair of oppositely disposed substantially semi-circular brake shoes 11, spaced apart at their ends to permit suitable expansion and contraction within the drum, and having at each end and abutting eccentric 12 mounted on a rotatable shaft for suitable adjustment of the shoes. Adjacent ends of opposite shoes are connected by relatively heavy tension springs 14.

Adjacent its central portion each shoe is provided with a projection 11', to the center of which is pivotally connected as by a pivot 15 a torque arm 16, the opposite ends of which are pivotally connected as by a pivot 17 to the mounting plate 20 the drum 10. The torque arms on opposite sides and abutting the opposite shoes extend in opposite directions as best shown in Figure 1.

Suitable hydraulic cylinders 18 are provided on opposite sides of the axle 10', containing conventional hydraulically operated pistons which in turn actuate piston rods 19 connected to the projection 11'.

As best shown in Figure 2, the brake drums are provided with conventional brake lining 21. As previously mentioned the eccentrics 12 abutting the ends of the shoes 11 are mounted on rotatable shafts 13. These shafts 13 extend as best shown in Figures 5 and 6 through the mounting plate 20 and terminate in polygonal heads 22 in order that they may be rotated from the exterior of the mounting plate to provide the desired adjustment for the ends of the brake shoe.

From the foregoing the operation of the device should now be readily understandable. The sole connection of the brake shoes comprise the piston rods 19 and the pivotally connected torque arms 16, which are connected to the mounting plate. Accordingly, both of the brake shoes are substantially free floating in the brake drum. Thus it will be seen that when pressure is exerted by the hydraulic mechanism against the shoes, the pressure is substantially equally applied throughout the entire peripheral extent thereof, being relatively equalized by the action of the torque arms 16 and the rotation about the pivots 15 and 17.

Thus it will be seen that due to the equalized pressure "wrap-around" is substantially precluded, and equal wear is exerted on the brake lining at all points about the periphery of the drum and shoes.

From the foregoing it will now be seen that there is herein provided an improved brake mechanism accomplishing all of the objects of this invention, and others, including many advantages of great practical utility and commercial importance.

As many embodiments may be made of this inventive concept and as many modifications may be made in the embodiment hereinbefore shown and described, it is to be understood that all matter herein is to be interpreted merely as illustrative and not in a limiting sense.

I claim:

1. In a vehicle brake comprising a rotary drum, a fixed support, a pair of brake shoes being equally spaced at their opposite ends and having inwardly directed diametrically opposed projections, supporting links pivoted to said fixed supports and to said projections, radially and axially aligned opposed hydraulic cylinders mounted on said fixed supports, pistons slidably received in said cylinders, and rods pivotally connected between said pistons and said brake shoe projections for actuating the same.

2. In a vehicle brake comprising a rotary drum, a fixed support, a pair of brake shoes being equally spaced at their opposite ends and having inwardly directed diametrically opposed projections, supporting links pivoted to said fixed support and to said projections, radially and axially aligned opposed hydraulic cylinders mounted on said fixed supports, pistons slidably received in said cylinders, rods pivotally connected between said pistons and said brake shoe projections for actuating the same, and eccentric adjusting means disposed at the opposite ends of each brake shoe in contact therewith having means for adjusting the same on the outer surface of said fixed supports.

3. In a vehicle brake comprising a rotary drum, a fixed support, a pair of brake shoes being equally spaced at their opposite ends and having inwardly directed diametrically opposed projections, supporting links pivoted to said fixed support and to said projections, radially and axially aligned opposed hydraulic cylinders mounted on said fixed supports, pistons slidably received in said cylinders, rods pivotally connected between said pistons and said brake shoe projections for actuating the same, eccentric adjusting means disposed at the opposite ends of each brake shoe in contact therewith having means for adjusting the same on the outer surface of said fixed support, and coil springs secured to the adjacent ends of said brake shoes.

HERBERT J. CORCORAN.

REFERENCES CITED

The following references are of record in the file of this patent:

UNITED STATES PATENTS

| Number | Name | Date |
|---|---|---|
| 1,603,008 | Hilton | Oct. 12, 1926 |
| 1,898,108 | White | Feb. 21, 1933 |
| 2,068,588 | Algee | Jan. 19, 1937 |
| 2,197,452 | Fussell | Apr. 16, 1940 |
| 2,202,661 | Jeffery | May 28, 1940 |
| 2,376,889 | Zipper | May 29, 1945 |